United States Patent
Strom (10) Patent No.: US 8,439,617 B2
(45) Date of Patent: May 14, 2013

(54) SELF-TAPPING AND SELF-ALIGNING INSERT TO REPLACE DAMAGED THREADS

(76) Inventor: Carl Strom, Topanga, CA (US)

( * ) Notice: Subject to any disclaimer, the term of this patent is extended or adjusted under 35 U.S.C. 154(b) by 272 days.

(21) Appl. No.: 12/877,967

(22) Filed: Sep. 8, 2010

(65) Prior Publication Data

US 2010/0329813 A1    Dec. 30, 2010

Related U.S. Application Data

(63) Continuation-in-part of application No. 11/982,067, filed on Oct. 31, 2007, now Pat. No. 7,819,613.

(51) Int. Cl.
*F16B 25/00* (2006.01)

(52) U.S. Cl.
USPC .......................................... 411/386; 411/417

(58) Field of Classification Search .................. 411/178, 411/386–387.8, 417
See application file for complete search history.

(56) References Cited

U.S. PATENT DOCUMENTS

| | | | |
|---|---|---|---|
| 1,949,618 A | 3/1934 | Molberg | |
| 2,795,221 A | 6/1957 | Braendel | |
| 2,922,455 A | 1/1960 | Braendel | |
| 3,260,150 A | 7/1966 | Colman | |
| 3,402,613 A | 9/1968 | Neusel et al. | |
| 3,405,596 A | 10/1968 | Nauschotz | |
| 3,430,531 A | 3/1969 | Bosse | |
| 3,597,781 A | 8/1971 | Eibes et al. | |
| 3,662,643 A | 5/1972 | Scheffer | |
| 3,866,509 A | 2/1975 | Kraus et al. | |
| 4,097,061 A | 6/1978 | Dietlein | |
| 4,601,625 A | 7/1986 | Ernst et al. | |
| 4,730,968 A | 3/1988 | Diperstein et al. | |
| 5,000,638 A | 3/1991 | Essom et al. | |
| 5,131,795 A | 7/1992 | Kobusch | |
| 5,211,520 A | 5/1993 | McKinney | |
| 5,547,323 A | 8/1996 | Fang | |
| 5,549,431 A | 8/1996 | Royle | |
| 5,755,542 A | 5/1998 | Janusz et al. | |
| 6,261,039 B1 | 7/2001 | Reed | |
| 6,382,893 B1 | 5/2002 | Reed | |
| 6,435,788 B2 | 8/2002 | Reed | |

(Continued)

OTHER PUBLICATIONS

Garserts Catalog, dated Jul. 23, 2008, obtained from www.gardspecialists.com website Aug. 2010.

*Primary Examiner* — Flemming Saether
(74) *Attorney, Agent, or Firm* — James M. Duncan, Esq.; Klein, DeNatale, Goldner (57) ABSTRACT

A self-tapping insert is installed in a pre-existing bore hole in a workpiece by rotating the insert, causing cutting threads on the exterior of the self-tapping insert to cut new threads. Engagement threads on the exterior of the self-tapping insert engage the new threads to retain the self-tapping insert within the workpiece. The self-tapping insert may comprise internal threads which are used to replace damaged threads in the workpiece. The means of installing the self-tapping insert may include a drive bolt having threads which make up into those of the self-tapping insert's internal threads. The self-tapping insert is aligned within the bore hole by means of a detachable pilot, which is connected to the insert with attachment means. The attachment means include the pilot being attached to the drive bolt. The pilot may be attached to the drive bolt means of left-handed threads in an axially-centered aperture of the pilot and matching left-handed threads on the end of the drive bolt.

4 Claims, 5 Drawing Sheets

U.S. PATENT DOCUMENTS

| | | |
|---|---|---|
| 6,530,731 B2 | 3/2003 | Wheeler |
| 7,140,825 B2 | 11/2006 | Takahashi et al. |
| 7,322,978 B2 | 1/2008 | West, Jr. |
| 7,736,381 B2 * | 6/2010 | Biedermann et al. .......... 606/301 |
| 7,819,613 B2 * | 10/2010 | Strom ........................... 411/178 |
| 2002/0131843 A1 | 9/2002 | Chen-Chi et al. |
| 2004/0015172 A1 * | 1/2004 | Biedermann et al. ........... 606/73 |
| 2004/0136807 A1 | 7/2004 | Foerster, Jr. |
| 2006/0013671 A1 | 1/2006 | Lauderbaugh |
| 2006/0115345 A1 | 6/2006 | Mardinger et al. |
| 2007/0053763 A1 | 3/2007 | Allaart et al. |
| 2007/0053764 A1 | 3/2007 | Gahler et al. |

\* cited by examiner

SELF-TAPPING AND SELF-ALIGNING INSERT TO REPLACE DAMAGED THREADS

CROSS-REFERENCE TO RELATED APPLICATION

This is a continuation-in-part application of U.S. application Ser. No. 11/982,067 which was filed on Oct. 31, 2007 to which application this inventor claims domestic priority.

BACKGROUND OF THE INVENTION

The present invention generally relates to fasteners and threaded workpieces, and more particularly to affixing an internally threaded insert within a workpiece so that a threaded fastener may be made up to the workpiece utilizing the threads of the insert.

For a variety of reasons it is desirable to dispose a self-tapping sleeve within a workpiece. Most, but not all of the time, the self-tapping sleeve will have internal threads and will be utilized for thread replacement. For example, if pre-existing threads of the workpiece are damaged, the damaged threads may be replaced with the threads of the insert. One type of internally-threaded insert is self-tapping, such that the insert may be driven into a bore of the workpiece, cutting threads in the bore as the insert is driven. The self-tapping inserts have both internal threads for receiving a fastener and external threads. A first group of external threads cuts new threads in the bore, and a second group of external threads makes up into the new threads, thereby advancing and securing the self-tapping insert within the bore and thus providing new threads within the workpiece.

The most common use of self-tapping inserts is to provide replacement threads where the original threads of the workpiece have become damaged, and to stabilize the matrix material to prevent cracks from continuing or propagating. When the original threads become damaged, they can sometimes be repaired by chasing the damaged thread with a tap to restore the original thread shape. However, if the original thread shape cannot be restored by this measure, the thread must be replaced. One means of replacing the threads is to bore the hole to a larger diameter than the original thread diameter and to rethread the hole. However, a disadvantage of this procedure is that it requires a change in the fastener size from the original. If the equipment utilizes multiple fasteners of the original size, the different size fastener complicates maintenance and repair of the equipment because different tools are required, and correlating fasteners with the matching threads made more difficult. It is therefore desirable in some cases to be able to replace the original threads with threads of the same size so that the same size fastener may be utilized. In these cases, self-tapping inserts may be employed.

Self-tapping inserts are hardened steel cylinders, threaded on the exterior and, usually, in the interior. The interior thread diameter and pitch of the internal threads are those of the fastener to be installed. The exterior of the self-tapping insert comprises a section which cuts new threads (the "cutting section") and a section of threads which make up into the newly cut threads. The cutting section of the known self-tapping inserts is tapered and usually comprises three or more slots or holes, which interrupt the tapered threads, thereby forming teeth similar to those of a conventional thread tap. Typically a bolt (the "drive bolt") is used to drive the self-tapping insert into a pilot hole in the base metal. This pilot hole is usually made by drilling out the damaged threads as described above to form a bore hole in the base metal. As the insert is turned, the teeth of the cutting section engage and remove the base metal until the insert is fully installed and flush with the exterior surface of the workpiece. The insert remains in place within the workpiece by an interference fit between the newly cut threads in the workpiece and the exterior threads on the insert.

While in a well-equipped shop it is possible to correctly install known varieties of self-tapping inserts with shop equipment such as mills and drill presses, field installation of such devices with hand tools presents several disadvantages for the known self-tapping inserts. Because the known self-tapping inserts are tapered on the tapping end (i.e., the end which is first inserted into the bore hole), the inserts have a tendency to start tapping crookedly. The person performing the tapping procedure has no simple way other than by visual inspection to ascertain whether the insert is entering the bore hole straight—i.e., whether the longitudinal axis of the insert coincides with the longitudinal axis of the bore hole. The only way to ensure that the prior-art insert enters the bore straight is to utilize a magnetic drill ("mag drill") which attaches to the work-piece with an electromagnet. An example of such a mag drill is disclosed in U.S. Pat. No. 3,969,036 (Hougen). The procedure requires: (1) positioning the mag drill by means of a centering tool; (2) replacing the centering tool with a drill bit and drilling out the damaged threads; (3) customizing the drive bolt by removing its head so that it can be fitted to the chuck of the mag drill; (4) with the mag drill maintained in exactly the same location as established in step (1), threading the prior art insert onto the modified drive bolt and installing the modified drive bolt into the chuck of the mag drill; (5) driving the prior art insert two to three rotations with the mag drill, until it has started to cut new threads; and (6) completing the installation with a wrench, socket wrench, pneumatic impact wrench, mechanical torque multiplier, or hydraulic torque multiplier, depending upon the torque required to install the prior art insert.

It is important that the insert be installed straight, which means it must be correctly aligned at the initiation of the installation procedure. If the insert is too crooked during installation, the insert may shatter when partially installed because of the hardness of the insert. If the insert is installed crooked and does not shatter, the fastener will often not align correctly with the insert. The alignment problem becomes more severe for larger inserts. In recognition of this problem, one manufacturer of self-tapping inserts requires that the installation method for larger diameter inserts (such as larger than ¾ inch) include counter-boring or partially pre-tapping the pilot hole for the insert such that the insert will be properly aligned within the hole. Counter-boring or pre-tapping the pilot holes are demanding, time-consuming and expensive procedures requiring large-diameter drill bits and/or taps, often under difficult field conditions.

A need therefore exists for a self-tapping insert which aligns itself correctly to the axis of the workpiece's borehole, without the need to counter-bore or pre-tap, and without the aid of magnetic drills, mills, drill presses, vises, collets, or similar devices.

SUMMARY OF THE INVENTION

The present invention is directed to embodiments of a self-tapping insert which meets one or more of the needs identified above. The disclosed self-tapping insert is utilized to provide new threads within the smooth bore of a workpiece. If the insert is utilized to provide new threads to replace damaged threads, the damaged threads are drilled out to provide the smooth bore.

An embodiment of the disclosed self-tapping threaded insert comprises a cylindrical body having a top, a bottom, an interior portion and an exterior portion, where the cylindrical body defines a central axis. The interior portion of the insert may comprise a first set of threads. The exterior portion comprises tapping or cutting threads and engagement threads. In relative order from the bottom of the cylindrical body (i.e., the end of the insert first inserted within the borehole), the exterior portion of the insert comprises a plurality of cutting threads and a plurality of engagement threads.

An embodiment of the self-tapping insert further comprises a pilot extension member which is removeably attached to the device. The pilot extension member increases the effective length of the self-tapping insert to allow greater penetration of the insert within the pilot hole, thereby reducing the angle of deflection between the longitudinal axis of the smooth bore and the central axis of the self-tapping insert The cutting threads comprise means for cutting threads in the smooth bore which are used for locking the insert within the bore. The engagement threads thereafter engage the insert locking threads as the insert is made up into the bore. A driving means is required to drive the body of the insert into the bore until the insert is completely seated within the bore.

Embodiments of the apparatus comprise means for cutting threads in the smooth bore. The thread cutting means may comprise one or more apertures in the cylindrical body where the apertures extend from the exterior portion to the interior portion of the insert, where each aperture comprises at the exterior portion a leading edge and a trailing edge. The apertures may be circular, oval, or elongated slots.

Embodiments of the apparatus may comprise means to drive the self-tapping insert into the borehole. The driving means may consist of a threaded bolt, whose threads match those of the self-tapping insert's interior threads, and whose constituent parts include, in order from its top, a hexagonal drive head, a threaded shank, and a threaded stem whose diameter is smaller than the diameter of the self-tapping insert's internal threads, and whose threads may be left-handed threads.

A means for aligning the self-tapping insert to the axis of the borehole comprises a pilot removeably attached to the drive bolt's threaded stem. An embodiment of the pilot comprises, at its top, a threaded bore centered upon the detachable pilot's longitudinal axis, and threaded with left-handed threads which match those of the drive bolt's threaded stem. The detachable pilot has a substantially cylindrical body having a top, a bottom, and exterior portion, where the cylindrical body defines a central axis. The detachable pilot may further comprise, centered on its bottom, a recessed broached hexagon, or other polygonal shapes suitable for a driver, whose point-to-point dimension and depth typically equal one-third to one-half of the detachable pilot's outside diameter. The broached hexagon serves as the receptacle for an Allen key or similar device, which is used to break free the pilot from the drive bolt's stem.

The detachable pilot's top, that is to say the part that threads onto the drive bolt's threaded stem and shoulders against the bottom of the self-tapping insert, comprises a threaded bore centered in the top of the pilot, where the diameter and thread pitch of the threaded bore are compatible with those of the drive bolt's stem, and the depth being such as to allow the detachable pilot to shoulder up against the bottom of the self-tapping insert.

These and other features, aspects, and advantages of the present invention will become better understood with regard to the following description, appended claims, and accompanying drawings.

DETAILED DESCRIPTION OF THE EMBODIMENTS

When the threads of a workpiece cannot be repaired by chasing the damaged thread with a tap to restore the original thread shape, replacement of the threads with a self-tapping insert provides an alternative method of repair. The pilot hole is usually made by drilling out the damaged threads to form a smooth walled bore hole in the base metal, and the prior art insert is placed within the bore hole.

Referring now specifically to the drawings, FIGS. 1 through 4 show a prior art self-tapping insert 20, which is a hardened steel cylinder, threaded on the exterior and interior. The prior art insert 20 comprises external threads 22, internal threads 24 and apertures 26. The prior art self-tapping insert 20 is generally installed with drive bolt 28 which makes up into internal threads 24 of the insert. The diameter and pitch of interior threads 24 are those of the fastener to be installed. The exterior of the self-tapping insert 20 comprises a first section 30 which cuts new threads (the "cutting section") and a second section 32 which comprises threads which make up into the newly cut threads.

Figure 1:
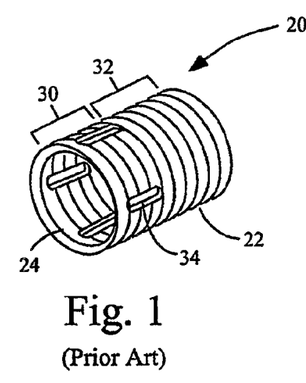
FIG. 1 is a perspective view of a prior art self-tapping insert.
Figure 2:
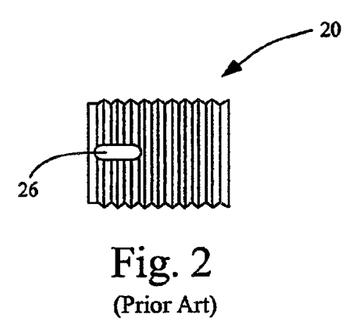
FIG. 2 is a side view of the prior art self-tapping insert depicted in FIG. 1.
Figure 3:
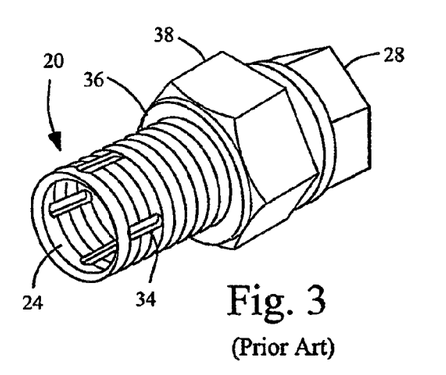
FIG. 3 is a perspective view of the prior art self-tapping insert shown in FIG. 1 attached to a drive bolt and utilizing a nut and washers for spacers.
Figure 4:
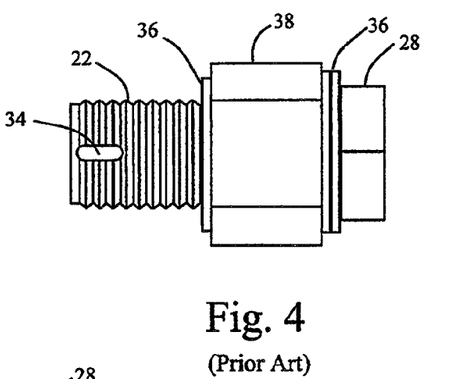
FIG. 4 is a side view of the prior art self-tapping insert and drive bolt combination shown in FIG. 3.
Figure 5:
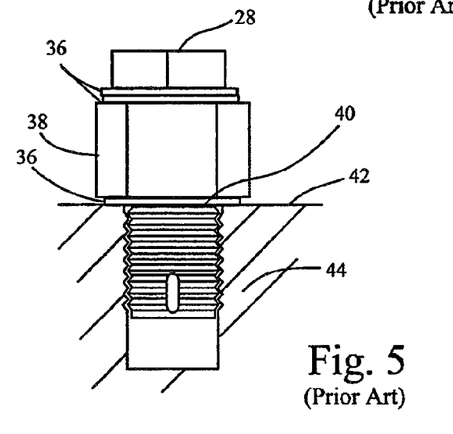
FIG. 5 schematically shows a prior art self-tapping insert, as ideally disposed within the bore hole of a workpiece prior to the removal of the drive bolt.

Drive bolt 28 is used to drive the prior art self-tapping insert 20 into a pilot hole in the workpiece 44 as schematically shown in FIG. 5. The cutting section 30 of the known self-tapping inserts is tapered and usually comprises three or more apertures 26 which interrupt the tapered threads. As the drive bolt 28 is rotated clock-wise (turned right-handed), the leading edges 34 of the apertures 26 engage and remove the base metal until the insert is fully installed and flush with the top surface 42 of the workpiece 44. Referring to FIG. 3, the term "leading edge" is defined as the edge of the aperture 26 which, as the insert 20 is rotated clock-wise, is the cutting edge.

The insert remains in place within the workpiece 44 by an interference fit between the newly cut threads in the workpiece and the threads of the second section 32 of the insert 20. Spacers, such as washers 36 or nut 38 are utilized to allow the top of the prior art insert 20, once installed, to be flush with the top surface 42 of the workpiece. However, as illustrated in FIG. 5, the larger diameter of the head of drive bolt 28, the washers 36, and nut 38, prevent setting the top 40 of the insert 20 below the top surface 42 of the workpiece 44 without substantial modifications to the tool configuration. It is to be appreciated that FIG. 5 depicts the ideal installation of a prior art self-tapping insert 20 into a workpiece 44, i.e., where the insert is straight with respect to the borehole such that the longitudinal axis of the insert is generally aligned with the axis of the bore hole.

Figure 6:
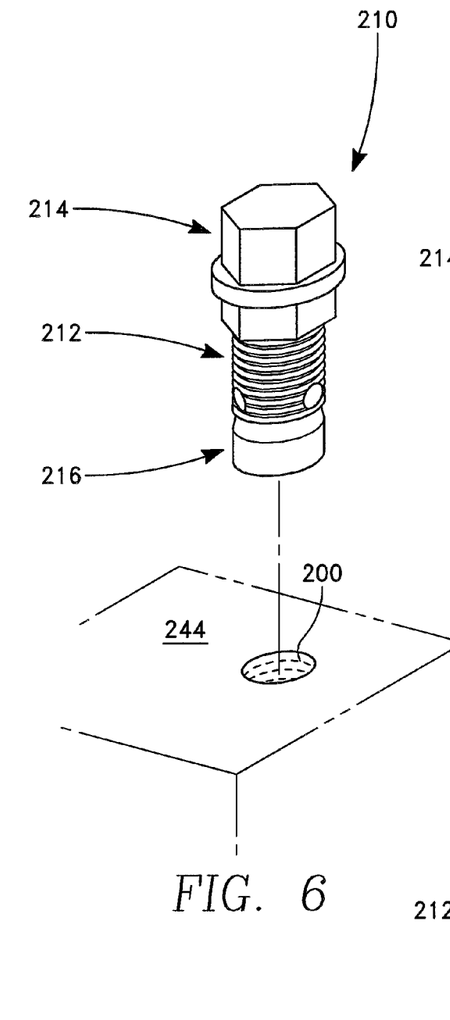
FIG. 6 shows an embodiment of the presently disclosed invention being inserted into the bore of work piece.

FIG. 6 shows an embodiment of the disclosed self-tapping self-guided insert 210 and components thereof. As best shown in the exploded view of FIG. 7, this embodiment may comprise a cylindrical body 212, a driving means, such as bolt 214, and a detachable pilot extension member 216. The components of the disclosed self-tapping self-guided insert 210 may be fabricated from various materials having the requisite mechanical properties based upon the material of the workpiece 244. Suitable materials comprise steel and various alloy steels. The hardness of self-tapping insert 210 will be higher than the hardness of the material of the workpiece. As discussed above, various features of embodiments of the disclosed apparatus, and the methods for installing the apparatus, allow the use of harder metals for the self-tapping insert, because the torque required to install the disclosed self-tapping insert is not as high as for the known self-tapping inserts. Instead of being limited to hardness values of approximately 54RC, the disclosed self-tapping insert have a greater hardness value because of the reduced risk of shattering during installation.

Cylindrical body 212 has a top 218 which, as shown in FIG. 10G, is the end which will be approximately flush with the top surface 242 of the work piece 244 and a bottom 220 which end directly abuts extension member 216. Cylindrical body 212 is shown in the figures to have interior threads 222.

The interior threads 222 will typically conform to the size and type of the damaged threads being replaced. The interior threads 222 will have standard threads to match those of the drive bolt 214, i.e. USS, SAE, and metric straight threads.

Cylindrical body 212 also has an exterior portion which term refers to all surfaces and structures on the exterior of the cylindrical body. As shown on FIG. 8, the cylindrical body 212 defines a central axis A. The exterior portion comprises, in relative order from the bottom 120 of the cylindrical body, a plurality of cutting threads 230, and a plurality of engagement threads 232.

Figure 8:
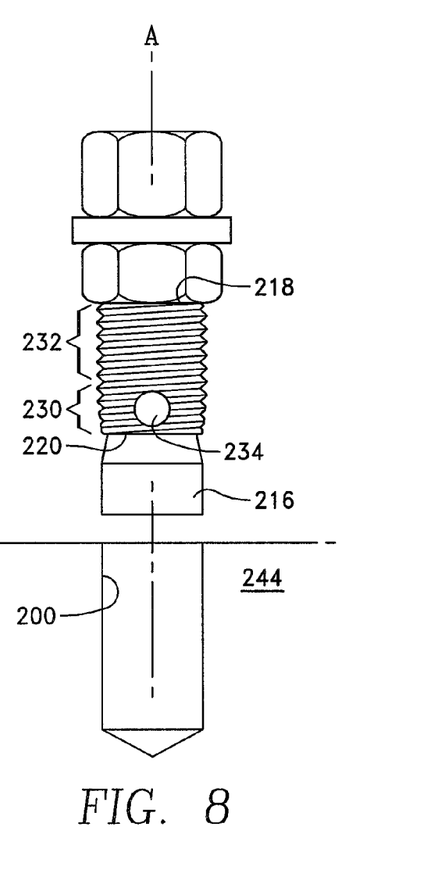
FIG. 8 shows a side view of an embodiment of the presently disclosed invention being inserted into the bore of a work piece.
Figure 9:
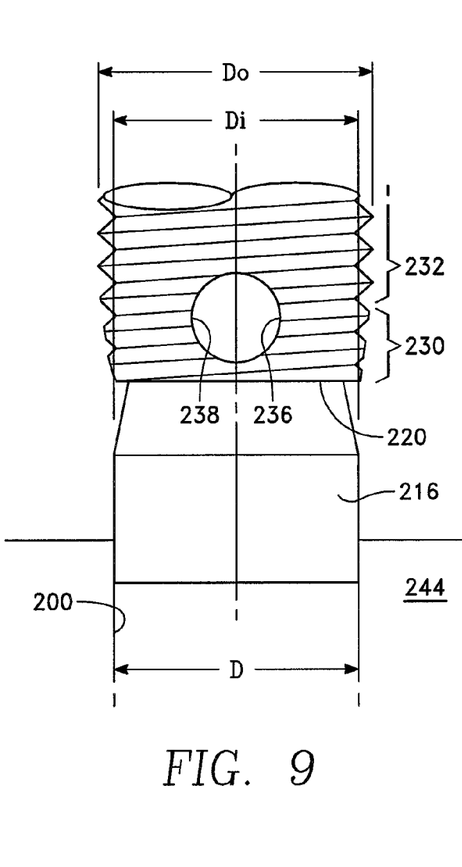
FIG. 9 shows a detailed view of the insert and detachable guide of an embodiment of the presently disclosed invention.
Figures 10, 11A:
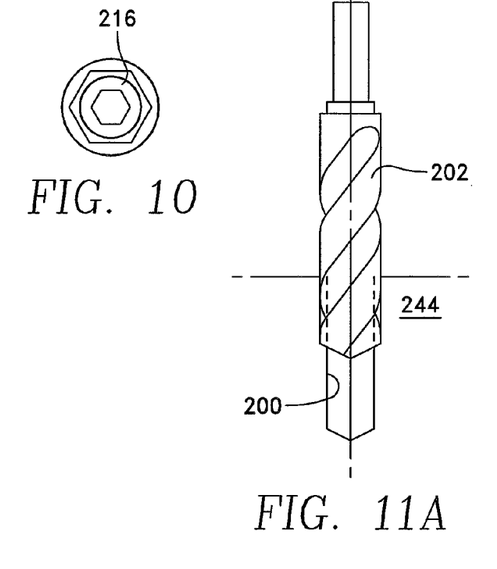
FIG. 10 shows a bottom view of the detachable guide.
FIGS. 11A through 11G show the installation procedure for an embodiment of the presently disclosed invention in a workpiece.

Cylindrical body 212 has an exterior thread diameter $D_o$ and an internal diameter D. Removeably attached to the cylindrical body 212 is detachable pilot extension member 216. The maximum diameter D of the pilot extension member 216 section 128 defines a plane which is perpendicular to the central axis A of the cylindrical body 212. Diameter D is sized to penetrate the smooth bore of the pilot hole, which is usually made by drilling out damaged threads. The length of the detachable pilot extension member 216 is configured to maintain the central axis A of the self-tapping insert in general alignment with the longitudinal axis of the smooth bore, as shown in FIG. 8. Detachable pilot extension member 216 may have a constant diameter D along its entire length. Alternatively, as indicated in the figures, the diameter of the pilot extension member may taper toward the connection to the cylindrical body 212. Diameter D is sized such that the detachable pilot extension member 216 penetrates the smooth bore, but the tolerances between the smooth bore and pilot member are relatively close. For example the tolerance between the internal diameter of the smooth bore and diameter D may range from 0.003 to 0.006 inches per side.

Cylindrical body 212 comprises a plurality of apertures 234 which extend from the exterior to the interior of the cylindrical body. The sides of the apertures 234 on the exterior of the cylindrical body 212 are bounded on opposing sides of the aperture by a leading edge 236 and a trailing edge 238, wherein, as the self-tapping insert is rotated into the smooth bore, the leading edge 236 will tap new threads as it progresses through the smooth bore. In one embodiment of the present self-tapping insert, the leading edge 236 is the same radial distance from the center of the insert as the trailing edge 238, i.e., the opposing side of the aperture. This embodiment may be the preferred embodiment in cases where the insert is a small diameter, such as less than 1 centimeter, where the amount of waste material created by the cutting of the thread is relatively small, and the torque required to install is relatively low.

As an alternative embodiment, the disclosed apparatus may also comprise a leading edge 236 which has a greater radial distance from the center of the insert than the trailing edge 238. The "height" (i.e., the radial extension) of the leading edge may be greater than that of the trailing edge. In other words, if a first diameter is defined by the rotation of the leading edge 236 about the central axis A and a second diameter is defined by the rotation of the trailing edge 238 about the central axis, the first diameter will be greater than the second diameter.

This feature, known as "chip relief", serves to direct chips to the interior of the insert rather than forcing chips into the newly cut threads. The resulting reduction of galling and binding reduces the torque required to seat the insert into the bore hole.

The disclosed self-tapping insert further comprises drive means, such as a drive bolt 214 made up into the internal threads 222 of cylindrical body 212. Drive bolt 214 may comprise various head configuration for attaching a desired socket or wrench for rotating the self-tapping insert 210. However, in contrast to prior art self-tapping inserts, the drive bolt 214 utilized in the present invention may provide means for attaching the detachable pilot extension member 216 to the self-tapping insert 210. In this embodiment, drive bolt 214 may comprise, in relative order from the top of the drive bolt, a polygonal head 250, a threaded shank 252, which has threads compatible with the interior threads 222 and a threaded stem 254 having a diameter less than the diameter of the threaded shank. Threaded stem 254 is made up into internal threads 256 of the detachable pilot extension member 216, and will be made up by rotation which is opposite of the make up direction of the threaded shank 252 into interior threads 222. For example, if threaded shank 252 is made up to internal threads 222 by right hand rotation, then detachable pilot extension member 216 would make up to threaded stem 254 by left hand rotation and vice-versa.

Figure 7:
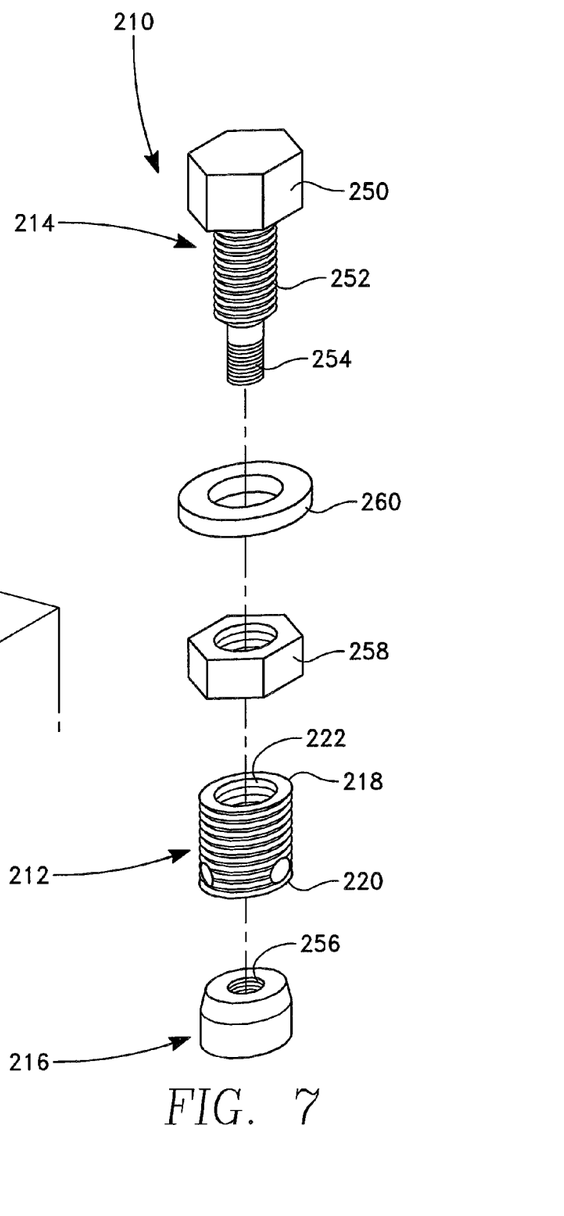
FIG. 7 shows an exploded view of the presently disclosed invention.
Figure 11B:
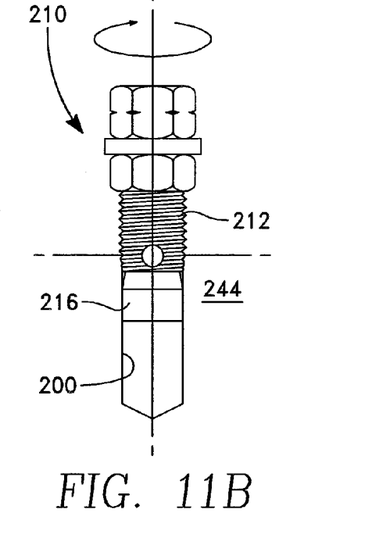
Figure 11C:
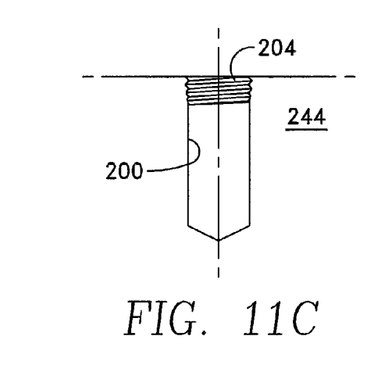
Figure 11D:
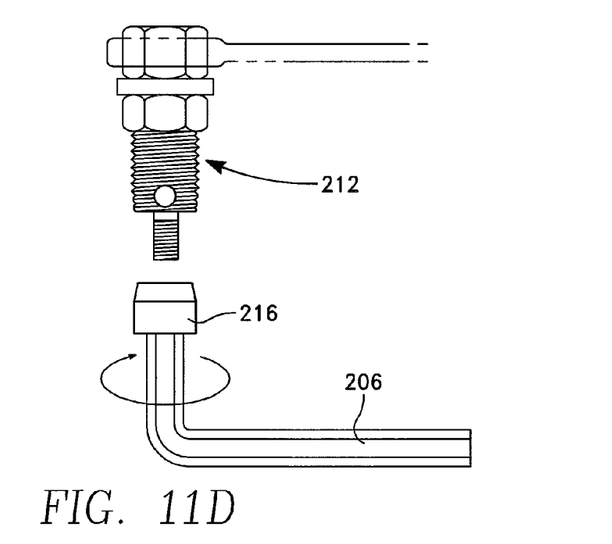
Figure 11E:
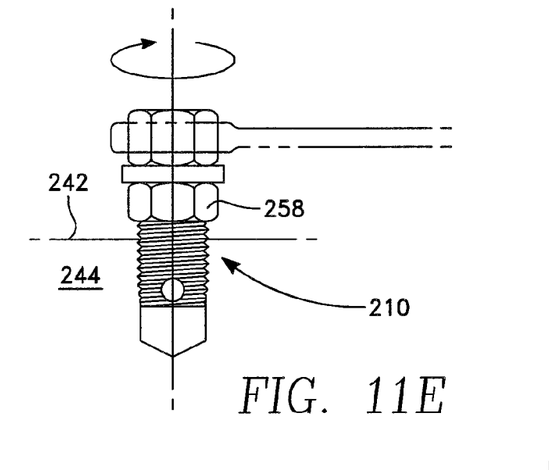
Figure 11F:
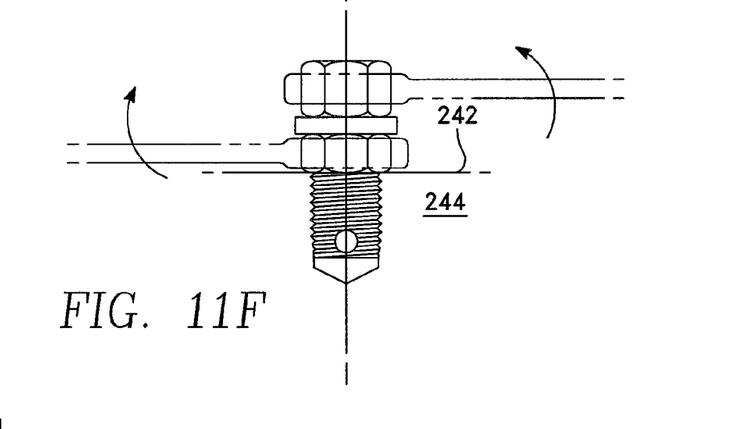
Figure 11G:
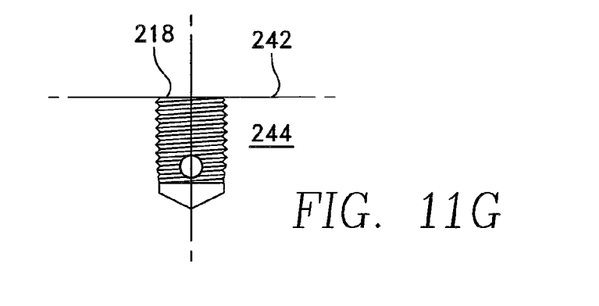

As shown in FIGS. 11A through 11G, a driving means, such as drive bolt 214, is utilized to rotate the self-tapping insert 210. The first step in the process is to drill a smooth bore hole 200 in the work piece 244 with drill 202. As best shown in FIG. 7, a nut 258 and washer 260 may be used to facilitate installation of the cylindrical body 212, which is the only part of the apparatus left in the bore hole 200 once installation has been completed. Once the bore hole 200 has been drilled, the self-tapping insert 210 is rotated several full turns to form several guide threads 204 in the bore hole 200 as shown in FIGS. 11B-11C. The entire self-tapping insert 210 is removed from the bore hole 200 and the detachable pilot extension member 216 is removed from the threaded stem 254 with an appropriate tool, such as Allen wrench 206, as shown in FIG. 11D. As shown in FIGS. 11E-11F, the self-tapping insert 210, with the detachable extension member 216 removed, is reinserted into the partially threaded bore hole 200 and rotated until nut 258 abuts the top surface 242 of work piece 244. Once the nut 258 abuts or shoulders against the top surface 242, the nut 258 is secured with a tool and the drive bolt 214 is removed.

These and other features, aspects, and advantages of the present invention will become better understood with regard to the following description, appended claims, and accompanying drawings. While the above is a description of various embodiments of the present invention, further modifications may be employed without departing from the spirit and scope of the present invention. For example, the size, shape, and/or material of the various components may be changed as desired. Thus the scope of the invention should not be limited by the specific structures disclosed. Instead the true scope of the invention should be determined by the following claims.

What is claimed is:

1. A self tapping insert for disposing within a smooth bore, said self-tapping insert comprising:
    a cylindrical body having a top, a bottom, an interior portion comprising a first set of threads, and an exterior portion, the cylindrical body defining a central axis;
    the exterior portion comprising, in relative order from the bottom of the cylindrical body, a plurality of cutting threads, the cutting threads comprising a leading edge and a trailing edge for cutting insert locking threads in the smooth bore, and a plurality of engagement threads, the engagement threads sized to engage the insert locking threads;
    a removable pilot extension member having a generally smooth uninterrupted surface with a diameter and a first length, the diameter sized to penetrate the smooth bore and the first length configured to maintain the central axis of the self-tapping insert in alignment with the longitudinal axis of the smooth bore; and
    a drive bolt made up into the first set of threads for driving the cylindrical body into the smooth bore,
    wherein the removable pilot extension member is threadably engaged with the drive bolt,
    and further wherein the drive bolt comprises, in relative order from the top of the drive bolt, a polygonal head, a threaded shank having threads compatible with the first set of threads, and a threaded stem having a diameter less than the diameter of the threaded shank.

2. The self-tapping insert of claim 1 wherein the removable pilot extension member comprises an axially-centered threaded aperture, the threads of the threaded aperture compatible with the threads of the threaded stem.

3. The self-tapping insert of claim 2 wherein the threads of the threaded aperture and threaded stem comprise left-hand threads.

4. The self-tapping insert of claim 2 wherein the axially-centered threaded aperture further comprises a hexagonal profile adjacent to the threads.

* * * * *